United States Patent
Kanie

(10) Patent No.: US 8,587,443 B2
(45) Date of Patent: Nov. 19, 2013

(54) GAS LEVEL DISPLAY CONTROLLER, GAS LEVEL DISPLAY DEVICE, AND GAS LEVEL DISPLAY CONTROL METHOD

(75) Inventor: Naoki Kanie, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 748 days.

(21) Appl. No.: 12/739,819

(22) PCT Filed: Oct. 20, 2008

(86) PCT No.: PCT/JP2008/069388
§ 371 (c)(1),
(2), (4) Date: Apr. 26, 2010

(87) PCT Pub. No.: WO2009/054517
PCT Pub. Date: Apr. 30, 2009

(65) Prior Publication Data
US 2010/0245098 A1    Sep. 30, 2010

(30) Foreign Application Priority Data
Oct. 24, 2007    (JP) .................................. 2007-276567

(51) Int. Cl.
*G08B 17/10* (2006.01)
(52) U.S. Cl.
USPC ............... 340/632; 702/55; 702/50; 702/138; 702/140; 73/290 R
(58) Field of Classification Search
USPC ......... 340/632; 702/55, 50, 138, 140; 701/33; 374/142; 73/866.3, 290 R
See application file for complete search history.

(56) References Cited

FOREIGN PATENT DOCUMENTS

| JP | 59-31415 A | 2/1984 |
|---|---|---|
| JP | 61-82116 A | 4/1986 |
| JP | 2003-28393 A | 1/2003 |
| JP | 2003-172654 A | 6/2003 |
| JP | 2004-063205 A | 2/2004 |
| JP | 2005-240854 A | 9/2005 |
| JP | 2006-112492 A | 4/2006 |
| JP | 2006-242839 A | 9/2006 |
| WO | WO 2006/006033 A2 | 6/2006 |

*Primary Examiner* — Steven Lim
*Assistant Examiner* — Hongmin Fan
(74) *Attorney, Agent, or Firm* — Kenyon & Kenyon LLP

(57) ABSTRACT

A gas level display controller sequentially calculates a mass of a compressed gas stored in a tank and makes a comparison between a first calculated value obtained at a first timing and a second calculated value obtained at a second timing later than the first timing. When the second calculated value is smaller than the first calculated value, the gas level display controller makes the remaining amount of the compressed gas in the tank displayed on a predetermined display device, based on the second calculated value. When the second calculated value is not smaller than the first calculated value, the gas level display controller makes the remaining amount of the compressed gas in the tank displayed on the predetermined display device, based on the first calculated value. This arrangement effectively prevents the display of the remaining amount of the compressed gas in the tank on the display device from including erroneous display, which indicates an increase of the gas level, regardless of no additional supply of the compressed gas into the tank.

5 Claims, 3 Drawing Sheets

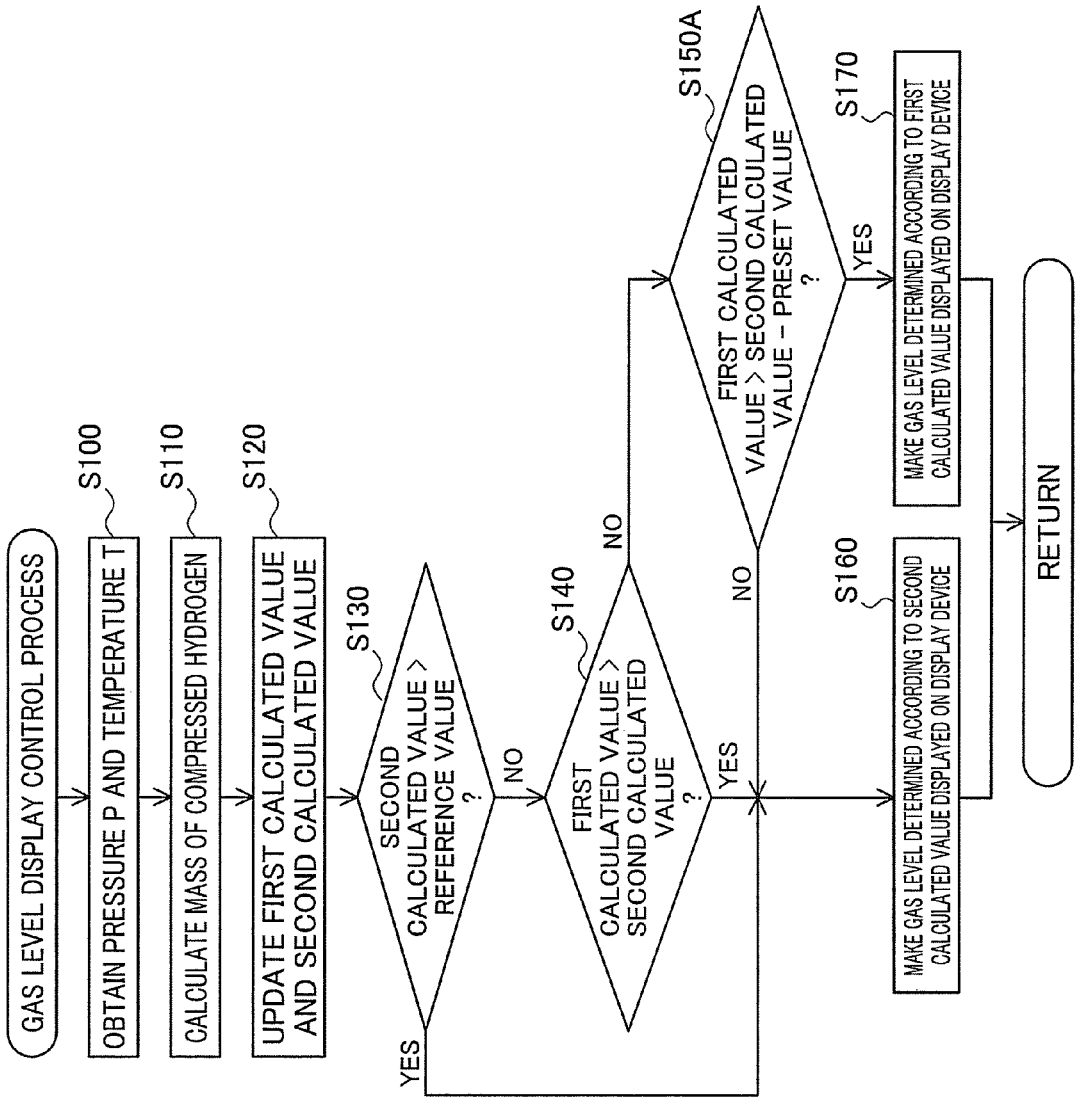

GAS LEVEL DISPLAY CONTROLLER, GAS LEVEL DISPLAY DEVICE, AND GAS LEVEL DISPLAY CONTROL METHOD

This is a 371 national phase application of PCT/JP2008/069388 filed 20 Oct. 2008, which claims priority of Japanese Patent Application No. 2007-276567 filed 24 Oct. 2007, the contents of which are incorporated herein by reference.

TECHNICAL FIELD

The present invention relates to a technique of causing a remaining amount of a compressed gas stored in a tank to be displayed on a predetermined display device.

BACKGROUND ART

Various techniques have been proposed to display the remaining amount of a compressed gas stored in a tank (see, for example, JP-A-2005-240854). The prior art technique disclosed in this cited reference JP-A-2005-240854 calculates the mass of a compressed gas fuel (compressed gas) stored in a tank from the pressure and the temperature of the compressed gas fuel and displays the remaining amount of the compressed gas fuel in the tank. Other known relevant techniques include those disclosed in JP-A-2004-63205, JP-A-59-31415, JP-A-2006-112492, and JP-A-2006-242839.

In the prior art technique disclosed in this cited reference JP-A-2005-240854, the outputs of, for example, a pressure sensor, a temperature sensor, and respective electronic components of a gas level display device include errors, which cause variations of the respective output values. Even when the actual mass of the compressed gas in the tank is unchanged but is constant, the calculated mass of the compressed gas in the tank has a variation (an increase or a decrease). This may undesirably cause the display of the remaining amount or the level of the compressed gas in the tank to include erroneous display, which indicates an increase of the level of the compressed gas in the tank, regardless of no additional supply of the compressed gas into the tank.

DISCLOSURE OF THE INVENTION

In order to solve the problem of the prior art discussed above, there would be a requirement for preventing the display of a remaining amount of a compressed gas in a tank on a display device from including erroneous display, which indicates an increase of a gas level, regardless of no additional supply of the compressed gas into the tank.

The present invention accomplishes at least part of the requirement mentioned above and the other relevant requirements by any of various aspects and applications discussed below.

A first aspect of the invention is directed to a gas level display controller constructed to cause a remaining amount of a compressed gas stored in a tank to be displayed on a predetermined display device. The gas level display controller has a mass computation module configured to calculate a mass of the compressed gas. The gas level display controller also has a display control module configured to make a remaining amount of the compressed gas displayed on the display device, based on a first calculated value obtained at a first timing by the mass computation module and a second calculated value obtained at a second timing later than the first timing by the mass computation module. The display control module is further configured to perform display control. Under a condition that the second calculated value is smaller than the first calculated value, the display control makes the remaining amount of the compressed gas displayed on the display device, based on the second calculated value. Under a condition that the second calculated value is not smaller than the first calculated value, the display control makes the remaining amount of the compressed gas displayed on the display device, based on the first calculated value.

The gas level display controller according to the first aspect of the invention calculates the mass of the compressed gas in the tank as the first calculated value at the first timing and calculates the mass of the compressed gas in the tank as the second calculated value at the second timing later than the first timing. The gas level display controller performs the display control. Under the condition that the second calculated value is smaller than the first calculated value, the display control makes the remaining amount of the compressed gas in the tank displayed on the display device, based on the second calculated value. Under the condition that the second calculated value is not smaller than the first calculated value, the display control makes the remaining amount of the compressed gas in the tank displayed on the display device, based on the first calculated value. The first calculated value and the second calculated value are sequentially updated every time the mass of the compressed gas in the tank is calculated at a predetermined timing, for example, at a predetermined cycle. This arrangement of the gas level display controller effectively prevents the display of the remaining amount of the compressed gas in the tank on the display device from including erroneous display, which indicates an increase of the gas level, regardless of no additional supply of the compressed gas into the tank.

In one preferable embodiment of the gas level display controller according to the first aspect of the invention, the mass computation module calculates the mass of the compressed gas, based on a pressure and a temperature of the compressed gas.

The gas level display controller of this embodiment calculates the mass of the compressed gas in the tank, based on the pressure and the temperature of the compressed gas in the tank, for example, according to a known gas state equation. This arrangement of the gas level display controller enables the remaining amount of the compressed gas in the tank to be accurately determined and adequately displayed on the display device.

In one preferable application of the gas level display controller according to the first aspect of the invention, under the condition that the second calculated value is not smaller than the first calculated value, when the first calculated value is greater than a difference between the second calculated value and a preset value, the display control performed by the display controller makes the remaining amount of the compressed gas displayed on the display device, based on the first calculated value. Under the condition that the second calculated value is not smaller than the first calculated value, when the first calculated value is not, greater than the difference between the second calculated value and the preset value, the display control performed by the display controller makes the remaining amount of the compressed gas displayed on the display device, based on the difference between the second calculated value and the preset value, in place of based on the first calculated value.

In the gas level display controller of this application, the preset value is a positive value and may be determined, for example, according to output errors of respective electronic components included in the gas level display controller. Under the condition that the second calculated value is not smaller than the first calculated value, when the first calculated value is greater than the difference between the second calculated value and the preset value (that is, the result of subtraction of the preset value from the second calculated value), the gas level display controller of this application performs the display control of making the remaining amount of the compressed gas displayed on the display device, based on the first calculated value. Under the condition that the second calculated value is not smaller than the first calculated value, when the first calculated value is not greater than the difference between the second calculated value and the preset value, the gas level display controller of this application performs the display control of making the remaining amount of the compressed gas displayed on the display device, based on the difference between the second calculated value and the preset value, in place of based on the first calculated value. Namely when the result of subtraction of the preset value from the second calculated value is still not smaller than the first calculated value, the reason of making the second calculated value greater than the first calculated value is ascribed to an additional supply of the compressed gas into the tank. The remaining amount of the compressed gas in the tank is thus displayed on the display device, based on the difference between the second calculated value and the preset value.

In another preferable application of the gas level display controller according to the first aspect of the invention, under the condition that the second calculated value is not smaller than the first calculated value, when the first calculated value is greater than a difference between the second calculated value and a preset value, the display control performed by the display controller makes the remaining amount of the compressed gas displayed on the display device, based on the first calculated value. Under the condition that the second calculated value is not smaller than the first calculated value, when the first calculated value is not greater than the difference between the second calculated value and the preset value, the display control performed by the display controller makes the remaining amount of the compressed gas displayed on the display device, based on the second calculated value, in place of based on the first calculated value.

As in the gas level display controller of the above application, in the gas level display controller of this application, the preset value is a positive value and may be determined, for example, according to the output errors of the respective electronic components included in the gas level display controller. Under the condition that the second calculated value is not smaller than the first calculated value, when the first calculated value is greater than the difference between the second calculated value and the preset value (that is, the result of subtraction of the preset value from the second calculated value), the gas level display controller of this application performs the display control of making the remaining amount of the compressed gas displayed on the display device, based on the first calculated value. Under the condition that the second calculated value is not smaller than the first calculated value, when the first calculated value is not greater than the difference between the second calculated value and the preset value, the gas level display controller of this application performs the display control of making the remaining amount of the compressed gas displayed on the display device, based on the second calculated value, in place of based on the first calculated value. Namely when the result of subtraction of the preset value from the second calculated value is still not smaller than the first calculated value, the reason of making the second calculated value greater than the first calculated value is ascribed to an additional supply of the compressed gas into the tank. The remaining amount of the compressed gas in the tank is thus displayed on the display device, based on the second calculated value.

In another preferable embodiment of the gas level display controller according to the first aspect of the invention, the display control module uses a value calculated by the mass calculation module after activation of the gas level display controller, as the first calculated value.

The gas level display controller of this embodiment uses the value calculated by the mass computation module after activation of the gas level display controller, as the first calculated value. This arrangement of the gas level display controller effectively prevents erroneous display of the gas level (that indicates an increase of the gas level, regardless of no additional supply of the compressed gas into the tank) in the course of consumption of the compressed gas in the tank.

In still another preferable embodiment of the gas level display controller according to the first aspect of the invention, prior to the display control, the display controller identifies the requirement or non-requirement of the display control, based on the second calculated value and a reference value. When the second calculated value is not greater than the reference value, the display controller identifies the requirement of the display control. When the second calculated value is greater than the reference value, the display controller identifies the non-requirement of the display control and makes the remaining amount of the compressed gas displayed on the display device, based on the second calculated value. In the gas level display controller of this embodiment, the reference value is a positive value.

In one preferable application of the gas level display controller of the above embodiment, the reference value may be set based on a pressure of the compressed gas.

In general, when the compressed gas remaining in the tank has a relatively large amount and a relatively high pressure level, the measurement of the pressure of the compressed gas in the tank has a relatively high detection accuracy. The relatively high detection accuracy leads to a relatively high calculation accuracy in the calculation of the mass of the compressed gas in the tank. When the compressed gas remaining in the tank decreases to a relatively small amount and has a relatively low pressure level, on the other hand, the measurement of the pressure of the compressed gas in the tank has a relatively low detection accuracy. The relatively low detection accuracy leads to a relatively low calculation accuracy in the calculation of the mass of the compressed gas in the tank. This increases the potential for erroneous display, which indicates an increase of the gas level, regardless of no additional supply of the compressed gas into the tank The gas level display controller of this application sets the reference value, based on the pressure of the compressed gas in the tank. Under the condition that the compressed gas remaining in the tank decreases to a relatively small amount, the gas level display controller performs the display control discussed previously. This arrangement effectively prevents erroneous display of the gas level (that indicates an increase of the gas level, regardless of no additional supply of the compressed gas into the tank), caused by the lowered detection accuracy of the pressure of the compressed gas in the tank.

In another preferable application of the gas level display controller of the above embodiment, the reference value may be set arbitrarily. For example, the reference value may be set to a higher value than the set reference value in the gas level display controller of the above application, independently of the pressure of the compressed gas in the tank. This is ascribed to the following reason. In the condition of a relatively low level of the compressed gas in the tank, the user tends to be concerned with the remaining amount or the current level of the compressed gas in the tank. In the condition of a relatively high level of the compressed gas in the tank, on the other hand, the user tends to be rather unconcerned with the remaining amount or the current level of the compressed gas in the tank.

A second aspect of the invention is directed to a gas level display controller constructed to cause a remaining amount of a compressed gas stored in a tank to be displayed on a predetermined display device. The gas level display controller has a gas level computation module configured to calculate a remaining amount of the compressed gas. The gas level display controller also has a display control module configured to make the remaining amount of the compressed gas displayed on the display device, based on a first calculated value obtained at a first timing by the gas level computation module and a second calculated value obtained at a second timing later than the first timing by the gas level computation module. The display control module is also configured to perform display control. Under a condition that the second calculated value is smaller than the first calculated value, the display control makes the remaining amount of the compressed gas displayed on the display device, based on the second calculated value. Under a condition that the second calculated value is not smaller than the first calculated value, the display control makes the remaining amount of the compressed gas displayed on the display device, based on the first calculated value.

Like the gas level display controller according to the first aspect of the invention, the gas level display controller according to the second aspect of the invention effectively prevents the display of the remaining amount of the compressed gas in the tank on the display device from including erroneous display, which indicates an increase of the gas level, regardless of no additional supply of the compressed gas into the tank.

A third aspect of the invention is directed to a gas level display device constructed to display a remaining amount of a compressed gas stored in a tank. The gas level display device includes: the gas level display controller having any of the configurations discussed above; and the display device.

The invention is not restricted to the gas level display controller or the gas level display device discussed above but may also be actualized by diversity of other applications, for example, a gas level display system, a gas level display control method, computer programs executed to attain the functions of these gas level display controller, device, system, and control method, recording media with such computer programs recorded therein, and data signals embodied in carrier waves to include such computer programs. Any of the additional arrangements discussed above may be adopted for any of these applications.

In the applications of the computer programs or the recording media with the computer programs recorded therein, the principle of the invention may be actualized as the whole programs for controlling the operations of the gas level display controller, the gas level display device, and the gas level display system or as part of the programs involved in the characteristics and the functions of the invention. Available examples of the recording medium include flexible disks, CD-ROMs, DVD-ROMs, magneto-optic disks, IC cards, ROM cartridges, punched cards, printed matter with barcodes or other suitable codes printed thereon, internal storage devices (memories like RAM and ROM) of the computer, external storage devices, and diversity of other computer readable media.

BRIEF DESCRIPTION OF THE DRAWINGS

FIG. 3 is a flowchart showing another flow of gas level display control process performed in a second embodiment of the invention.

BEST MODES OF CARRYING OUT THE INVENTION

Some modes of carrying out the invention are described below as preferred embodiments.

A. First Embodiment

A1. Gas Level Display System

Figure 1:
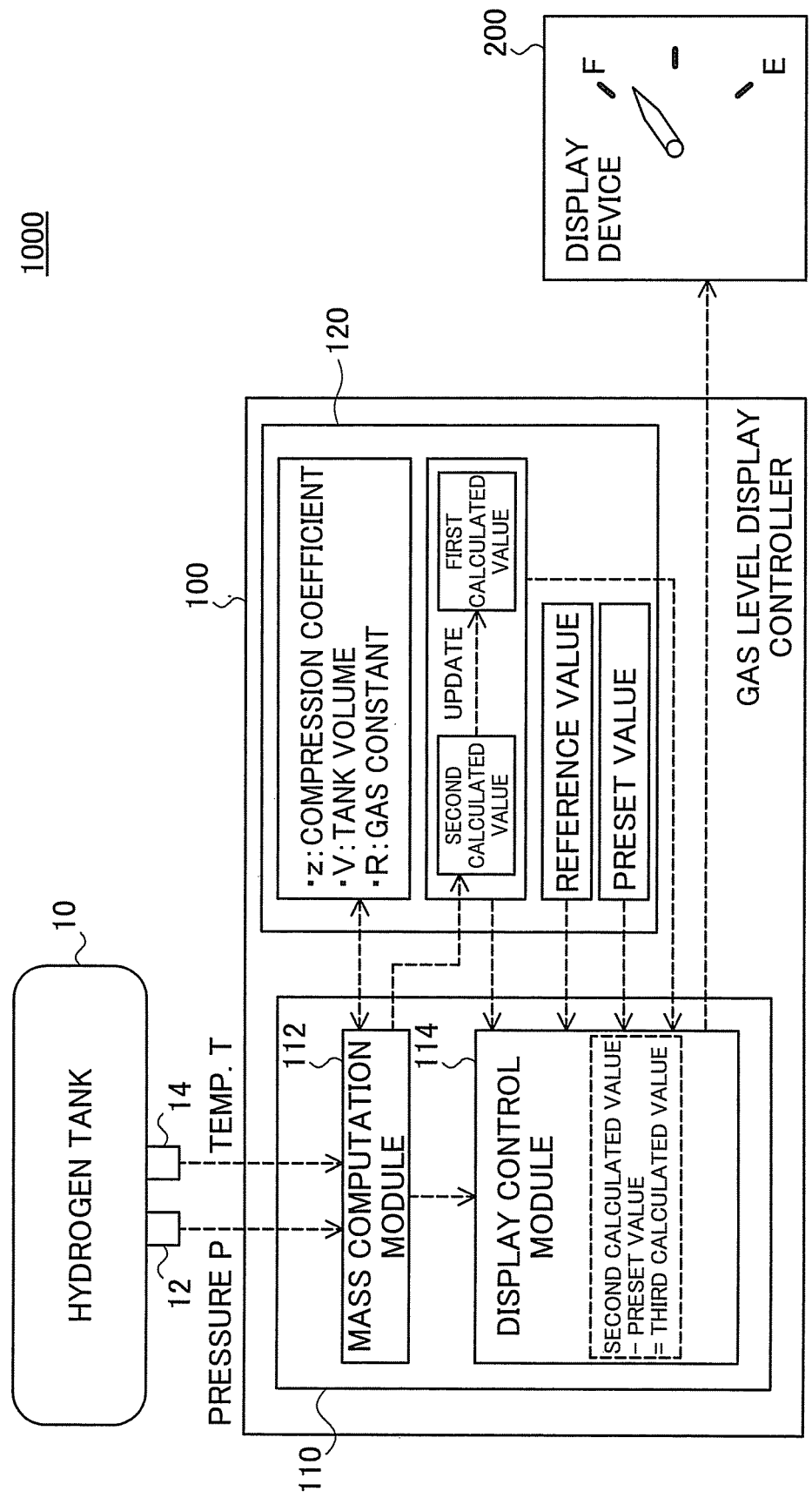
FIG. 1 is an explanatory view illustrating the schematic configuration of a gas level display system 1000 including a gas level display controller according to a first embodiment of the invention.

FIG. 1 is an explanatory view illustrating the schematic configuration of a gas level display system 1000 including a gas level display controller according to one embodiment of the invention. The gas level display system 1000 may be mounted on, for example, an electric vehicle driven with driving power from a motor, which consumes supply of electric power generated in fuel cells through an electrochemical reaction of hydrogen with oxygen.

As illustrated, the gas level display system 1000 includes a hydrogen tank 10, a gas level display controller 100, and a display device 200.

The hydrogen tank 10 is equipped with a pressure sensor 12 arranged to measure a pressure P of compressed hydrogen stored in the hydrogen tank 10 and with a temperature sensor 14 arranged to measure a temperature T of the compressed hydrogen stored in the hydrogen tank 10.

The gas level display controller 100 has a CPU 110 and memories 120. The memories 120 include a non-rewritable ROM, a rewritable ROM, and a RAM. The memories 120 store therein parameters used by a mass computation module 112 for calculation of a remaining amount of the compressed hydrogen in the hydrogen tank 10 and parameters used by a display control module 114 for display control as discussed later.

In this embodiment, a compression coefficient 'z' of hydrogen, a tank volume V of the hydrogen tank 10, a gas constant R, and the molecular weight of hydrogen are stored as the parameters used by the mass computation module 112 for calculating the remaining amount of the compressed hydrogen in the hydrogen tank 10. The compression coefficient 'z' varies according to the pressure and the temperature of the gas and is accordingly stored in the form of a map. A reference value (discussed later) and a preset value are stored as the parameters used by the display control module 114 for display control. The preset value is determined on the basis of the output errors of the pressure sensor 12, the temperature sensor 14, and the respective electronic components included in the gas level display controller 100. Both the reference value and the preset value are positive values. Masses of the compressed hydrogen in the hydrogen tank 10 calculated by the mass computation module 112 ('a first calculated value' and a 'second calculated value' as discussed later) are occasionally recorded and updated as the parameters used by the display control module 114 for display control.

The first calculated value represents a mass of the compressed hydrogen in the hydrogen tank 10 calculated at a first timing by the mass computation module 112. The second calculated value represents a mass of the compressed hydrogen in the hydrogen tank 10 calculated at a second timing, which is later than the first timing, by the mass computation module 112. For the purpose of easy understanding, in the specification hereof, the 'first calculated value' and the 'second calculated value' are respectively expressed as the 'first calculated value (previous calculated value)' and the 'second calculated value (current calculated value)'.

The CPU 110 includes the mass computation module 112 and the display control module 114. The CPU 110 reads a specified program from the memories 120 to actualize these functional blocks. At least part of these functional blocks may be actualized by the hardware configuration.

The mass computation module 112 calculates the mass of the compressed hydrogen in the hydrogen tank 10 according to a known gas state equation. Specifically the mass computation module 112 obtains the pressure P of the compressed hydrogen in the hydrogen tank 10 measured by the pressure sensor 12 and the temperature T of the compressed hydrogen in the hydrogen tank 10 measured by the temperature sensor 14 and calculates the mass of the compressed hydrogen in the hydrogen tank 10 from the compression coefficient 'z' set corresponding to the obtained values of the pressure P and the temperature T, the preset tank volume V of the hydrogen tank 10, the gas constant R, and the molecular weight of hydrogen. The relation of these parameters is expressed as $PV=znRT$, where 'n' denotes the number of moles of hydrogen. This equation is rewritten to $n=(PV)/(zRT)$. The mass of the compressed hydrogen in the hydrogen tank 10 is given as the product of the number of moles 'n' of hydrogen and the molecular weight of hydrogen.

As discussed later in detail, the display control module 114 makes a comparison between the second calculated value calculated by the mass computation module 112 and the reference value, a comparison between the first calculated value and the second calculated value, and a comparison between the first calculated value and a third calculated value (explained later). The display control module 114 determines the remaining amount or the current level of the compressed hydrogen in the hydrogen tank 10 to be displayed on the display device 200, based on the results of these comparisons and makes the determined level of the compressed hydrogen displayed on the display device 200.

A2. Gas Level Display Control Process

Figure 2:
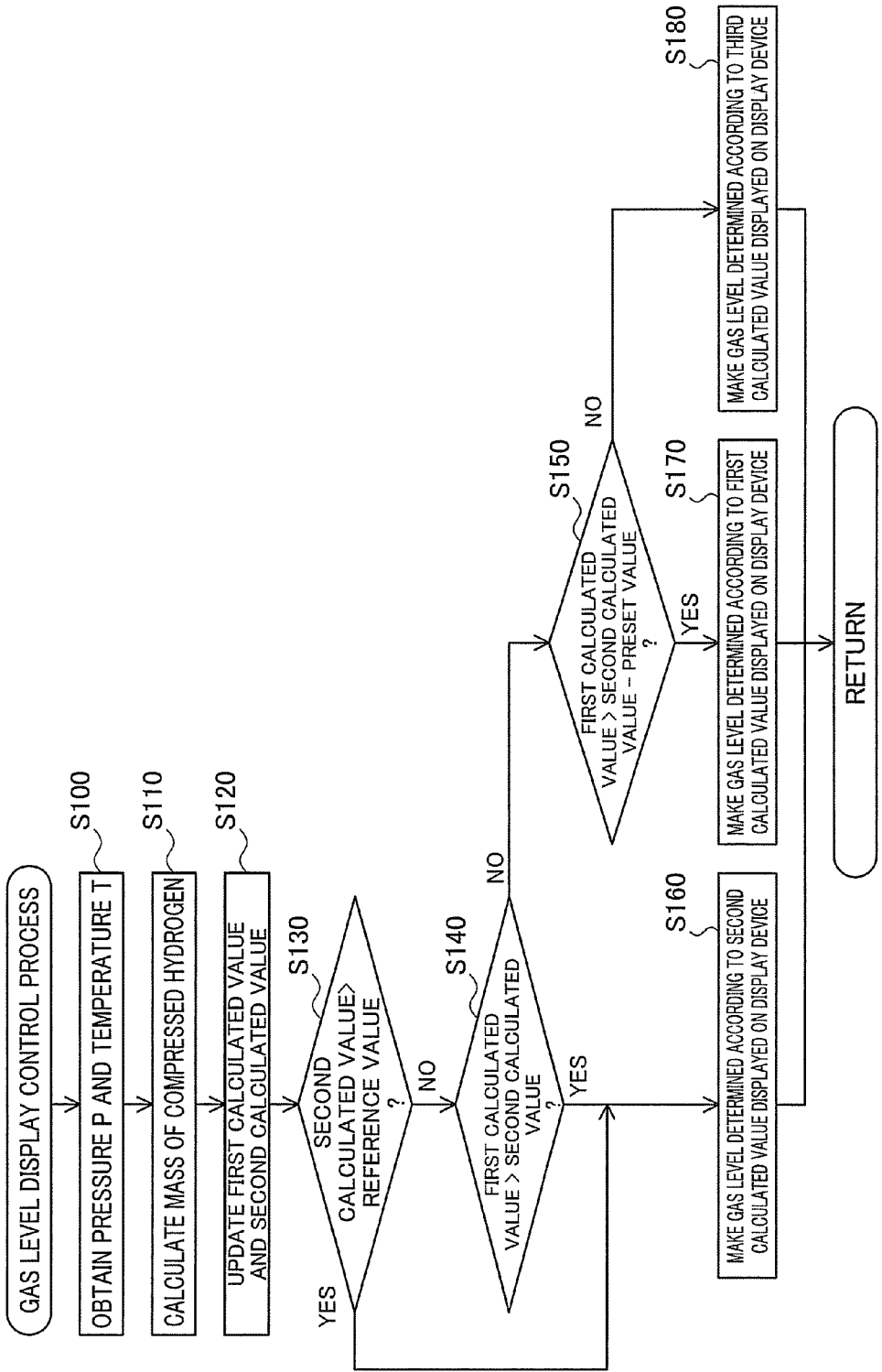
FIG. 2 is a flowchart showing a flow of gas level display control process performed in the first embodiment.

FIG. 2 is a flowchart showing a flow of gas level display control process performed in the first embodiment. The CPU 110 repeatedly executes this gas level display control process after activation of the gas level display controller 100.

The CPU 110 first obtains the pressure P of the compressed hydrogen in the hydrogen tank 10 measured by the pressure sensor 12 and the temperature T of the compressed hydrogen in the hydrogen tank 10 measured by the temperature sensor 14 (step S100).

The CPU 110 or specifically the mass computation module 112 then calculates the mass of the compressed hydrogen in the hydrogen tank 10 (step S110) according to the procedure explained above.

The CPU 110 subsequently updates the first calculated value (previous calculated value) and the second calculated value (current calculated value) stored in the memories 120 (step S120). In this embodiment, the first calculated value (previous calculated value) and the second calculated value (current calculated value) have been deleted from the memories 120 in the initial state at the time of activation of the gas level display controller 100. On a start of the gas level display control process immediately after activation of the gas level display controller 100, the CPU 110 or specifically the mass computation module 112 calculates the mass of the compressed hydrogen in the hydrogen tank 10 twice and respectively stores the calculated value obtained by the first calculation and the calculated value obtained by the second calculation as the first calculated value (previous calculated value) and the second calculated value (current calculated value) into the memories 120. This calculation and storage step is omitted from the illustrated flow.

The CPU 110 or specifically the display control module 114 makes a comparison between the second calculated value (current calculated value) and the preset value stored in the memories 120 (step S130).

When the compressed hydrogen remaining in the hydrogen tank 10 has a relatively large amount and a relatively high pressure level, the measurement of the pressure of the compressed hydrogen in the hydrogen tank 10 by the pressure sensor 12 has a relatively high detection accuracy. The relatively high detection accuracy leads to a relatively high calculation accuracy in the calculation of the mass of the compressed hydrogen in the hydrogen tank 10. When the compressed hydrogen remaining in the hydrogen tank 10 decreases to a relatively small amount and has a relatively low pressure level, on the other hand, the measurement of the pressure of the compressed hydrogen in the hydrogen tank 10 by the pressure sensor 12 has a relatively low detection accuracy. The relatively low detection accuracy leads to a relatively low calculation accuracy in the calculation of the mass of the compressed hydrogen in the hydrogen tank 10. This increases the potential for erroneous display, which indicates an increase of the gas level, regardless of no additional supply of the compressed hydrogen into the hydrogen tank 10. In this embodiment, the reference value is thus set, based on the pressure of the compressed hydrogen in the hydrogen tank 10, that is, based on the detection accuracy of the pressure sensor 12.

When the second calculated value (current calculated value) is greater than the preset value (step S130: Yes), the CPU 110 or specifically the display control module 114 determines the remaining amount or level of the compressed hydrogen in the hydrogen tank 10 to be displayed on the display device 200, based on the second calculated value (current calculated value) and makes the determined level of the compressed hydrogen in the hydrogen tank 10 displayed on the display device 200 (step S160). In this condition, the display of the remaining amount or level of the compressed hydrogen in the hydrogen tank 10 determined according to the second calculated value (current calculated value) and displayed on the display device 200 has a low probability of erroneous display, which indicates an increase of the gas level, regardless of no additional supply of the compressed hydrogen into the hydrogen tank 10.

When the second calculated value is not greater than the preset value (step S130: No), on the other hand, the CPU 110 or specifically the display control module 114 makes a comparison between the first calculated value (previous calculated value) and the second calculated value (current calculated value) (step S140) and performs a subsequent series of processing as discussed below. In this condition, the display of the remaining amount or level of the compressed hydrogen in the hydrogen tank 10 determined according to the second calculated value (current calculated value) and displayed on the display device 200 has a high probability of erroneous display, which indicates an increase of the gas level, regardless of no additional supply of the compressed hydrogen into the hydrogen tank 10.

When the first calculated value (previous calculated value) is greater than the second calculated value (current calculated value) (step S140: Yes), that is, when the second calculated value (current calculated value) is smaller than the first calculated value (previous calculated value), the CPU 110 or specifically the display control module 114 determines the remaining amount or level of the compressed hydrogen in the hydrogen tank 10 to be displayed on the display device 200, based on the second calculated value (current calculated value) and makes the determined level of the compressed hydrogen in the hydrogen tank 10 displayed on the display device 200 (step S160).

When the first calculated value (previous calculated value) is not greater than the second calculated value (current calculated value) (step S140: No), that is, when the second calculated value (current calculated value) is not smaller than the first calculated value (previous calculated value), on the other hand, the CPU 110 or specifically the display control module 114 calculates a difference (second calculated value–preset value) between the second calculated value (current calculated value) and the preset value stored in the memories 120 (hereafter the calculated difference is referred to as the third calculated value) and makes a comparison between the first calculated value and the third calculated value (step S150). The preset value has been determined according to the output errors of the pressure sensor 12, the temperature sensor 14, and the respective electronic components included in the gas level display controller 100 as mentioned previously.

When the first calculated value (previous calculated value) is greater than the third calculated value (step S150: Yes), that is, when the mass of the compressed hydrogen in the hydrogen tank 10 calculated by taking into account the output errors is smaller than the first calculated value, the CPU 110 or specifically the display control module 114 determines the remaining amount or level of the compressed hydrogen in the hydrogen tank 10 to be displayed on the display device 200, based on the first calculated value (previous calculated value) and makes the determined level of the compressed hydrogen in the hydrogen tank 10 displayed on the display device 200 (step S170). In this condition, it is highly probable that the reason of making the second calculated value (current calculated value) of not smaller than the first calculated value is ascribed to the output errors of the respective electronic components included in the gas level display controller 100.

When the first calculated value (previous calculated value) is not greater than the third calculated value (step S150: No), that is, when the mass of the compressed hydrogen in the hydrogen tank 10 calculated by taking into account the output errors is not smaller than the first calculated value, on the other hand, the CPU 110 or specifically the display control module 114 determines the remaining amount or level of the compressed hydrogen in the hydrogen tank 10 to be displayed on the display device 200, based on the third calculated value and makes the determined level of the compressed hydrogen in the hydrogen tank 10 displayed on the display device 200 (step S180). This condition suggests an additional supply of the compressed hydrogen into the hydrogen tank 10.

As described above, the gas level display controller 100 of the first embodiment effectively prevents the display of the remaining amount or level of the compressed hydrogen in the hydrogen tank 10 determined and displayed on the display device 200 from including erroneous display, which indicates an increase of the gas level, regardless of no additional supply of the compressed hydrogen into the hydrogen tank 10.

B. Second Embodiment

B1. Gas Level Display System

A gas level display system 1000 according to a second embodiment of the invention has a similar configuration to that of the gas level display system 1000 of the first embodiment shown in. FIG. 1. In the gas level display system 1000 of the second embodiment, a gas level display control process performed by the CPU 110 of the gas level display controller 100 in the second embodiment is partly different from the gas level display control process performed in the first embodiment. The gas level display control process of the second embodiment is discussed below.

B2. Gas Level Display Control Process

FIG. 3 is a flowchart showing a flow of the gas level display control process performed in the second embodiment. Like the first embodiment, the CPU 110 repeatedly executes this gas level display control process after activation of the gas level display controller 100.

As clearly understood from the comparison between the flowcharts of FIGS. 2 and 3, series of processing at steps S100 through S140 and S160 is identical with the processing at the corresponding steps in the gas level display control process of the first embodiment. The details of the processing at these steps are thus not specifically explained here.

In the gas level display control process of the second embodiment, when the first calculated value (previous calculated value) is not greater than the second calculated value (current calculated value) (step S140: No), that is, when the second calculated value (current calculated value) is not smaller than the first calculated value (previous calculated value), the CPU 110 or specifically the display control module 114 calculates a third calculated value or a difference (second calculated value–preset value) between the second calculated value (current calculated value) and the preset value stored in the memories 120 and makes a comparison between the first calculated value and the third calculated value (step S150A).

When the first calculated value (previous calculated value) is greater than the third calculated value (step S150A: Yes), that is, when the mass of the compressed hydrogen in the hydrogen tank 10 calculated by taking into account the output errors is smaller than the first calculated value, the CPU 110 or specifically the display control module 114 determines the remaining amount or level of the compressed hydrogen in the hydrogen tank 10 to be displayed on the display device 200, based on the first calculated value (previous calculated value) and makes the determined level of the compressed hydrogen in the hydrogen tank 10 displayed on the display device 200 (step S170). In this condition, it is highly probable that the reason of making the second calculated value (current calculated value) of not smaller than the first calculated value is ascribed to the output errors of the respective electronic components included in the gas level display controller 100.

When the first calculated value (previous calculated value) is not greater than the third calculated value (step S150A: No), that is, when the mass of the compressed hydrogen in the hydrogen tank 10 calculated by taking into account the output errors is not smaller than the first calculated value, on the other hand, the CPU 110 or specifically the display control module 114 determines the remaining amount or level of the compressed hydrogen in the hydrogen tank 10 to be displayed on the display device 200, based on the second calculated value (current calculated value) and makes the determined level of the compressed hydrogen in the hydrogen tank 10 displayed on the display device 200 (step S160). This condition suggests that the compressed hydrogen is newly supplied to the hydrogen tank 10.

Like the gas level display controller 100 of the first embodiment discussed previously, the gas level display controller 100 of the second embodiment effectively prevents the display of the remaining amount or level of the compressed hydrogen in the hydrogen tank 10 determined and displayed on the display device 200 from including erroneous display, which indicates an increase of the gas level, regardless of no additional supply of the compressed hydrogen into the hydrogen tank 10.

C. Other Aspects

The embodiments and their applications discussed above are to be considered in all aspects as illustrative and not restrictive. There may be many modifications, changes, and alterations without departing from the scope or spirit of the main characteristics of the present invention. Some possible modifications are given below.

C1. Modification 1

Application of the invention to the storage of the compressed hydrogen in the hydrogen tank 10 is described in the above embodiments. The principle of the invention is, however, not restricted to the storage of the compressed hydrogen but is applicable in general to storage of any compressed gas in a gas tank.

C2. Modification 2

In the embodiments discussed above, the mass computation module 112 calculates the mass of the compressed hydrogen in the hydrogen tank 10 according to the conventional gas state equation. This is, however, neither essential nor restrictive. The mass of the compressed hydrogen may be calculated according to any other suitable equation.

C3. Modification 3

In the embodiments discussed above, in the initial state at the time of activation of the gas level display controller 100, the first calculated value (previous calculated value) and the second calculated value (current calculated value) have been deleted from the memories 120. This condition is, however, neither essential nor restrictive. In the initial stage at the time of activation of the gas level display controller 100, the first calculated value and the second calculated value obtained immediately before previous stop of the gas level display controller 100 may be kept in the memories 120. The first calculated value and the second calculated value may then be updated at the time of current activation of the gas level display controller 100.

C4. Modification 4

In the embodiments discussed above, the 'reference value' used at step S130 in the gas level display control processes shown in FIGS. 2 and 3 is set, based on the pressure of the compressed hydrogen in the hydrogen tank 10, that is, based on the detection accuracy of the pressure sensor 12. Such setting is, however, neither essential nor restrictive. The reference value may be set arbitrarily. For example, the reference value may be set to a higher value than the set reference value in the above embodiments, independently of the pressure of the compressed hydrogen in the hydrogen tank 10. This is ascribed to the following reason. In the condition of a relatively low level of the compressed hydrogen in the hydrogen tank 10, the user tends to be concerned with the remaining amount or the current level of the compressed hydrogen in the hydrogen tank 10. In the condition of a relatively high level of the compressed hydrogen in the hydrogen tank 10, on the other hand, the user tends to be rather unconcerned with the remaining amount or the current level of the compressed hydrogen in the hydrogen tank 10.

C5. Modification 5

In the embodiments discussed above, the processing of step S130 is performed in the gas level display control processes shown in FIGS. 2 and 3. This processing step may be omitted when not required.

C6. Modification 6

In the embodiments discussed above, each of the gas level display control processes shown in FIGS. 2 and 3 calculates the difference (second calculated value−preset value) between the second calculated value (current calculated value) and the preset value and makes a comparison between the first calculated value and the difference between the second calculated value (current calculated value) and the preset value. This comparison is, however, neither essential nor restrictive. Any comparison substantially equivalent to this comparison may be performed instead. For example, a comparison may be made between the second calculated value and the sum of the first calculated value and the preset value. In another example, a comparison may be made between the preset value and the difference between the first calculated value and the second calculated value.

C7. Modification 7

In the embodiments discussed above, the gas level display controller 100 includes the mass computation module 112 to calculate the mass of the compressed hydrogen in the hydrogen tank 10 based on the pressure P and the temperature T of the compressed hydrogen in the hydrogen tank 10. This structure is, however, neither essential nor restrictive. The gas level display controller 100 may include, in place of the mass computation module 112, a gas level computation module that calculates the remaining amount or the level of the compressed hydrogen in the hydrogen tank 10 according to another procedure.

C8. Modification 8

In the structures of the embodiments discussed above, the gas level display controller 100 is provided separately from the display device 200. The gas level display controller and the display device may alternatively be integrated to constitute a gas level display device.

The invention claimed is:

1. A gas level display controller constructed to cause a remaining amount of a compressed gas stored in a tank to be displayed on a predetermined display device, the gas level display controller comprising:

a mass computation module configured to calculate a mass of the compressed gas; and a display control module configured to make a remaining amount of the compressed gas displayed on the display device, based on a first calculated value obtained at a first timing by the mass computation module and a second calculated value obtained at a second timing later than the first timing by the mass computation module, the display control module being programmed to display the remaining amount of the compressed gas on the display device, in accordance with the following algorithm:

if the first calculated value is greater than the second calculated value, then the displayed amount is based on the second calculated value;

otherwise, further compare the first calculated value against the difference between the second calculated value and a preset value; and if the first calculated value is greater, then the displayed amount is based on the first calculated value;

otherwise the displayed amount is based on the difference between the second calculated value and the preset value.

2. The gas level display controller in accordance with claim 1, wherein the mass computation module calculates the mass of the compressed gas, based on a pressure and a temperature of the compressed gas.

3. The gas level display controller in accordance with claim 1, wherein the display control module uses a value calculated by the mass calculation module after activation of the gas level display controller, as the first calculated value.

4. A gas level display device constructed to display a remaining amount of a compressed gas stored in a tank, the gas level display device comprising:

the gas level display controller in accordance with claim 1; and the display device.

5. A gas level display control method of causing a remaining amount of a compressed gas stored in a tank to be displayed on a predetermined display device, the gas level display control method comprising:

a mass computation step of calculating a mass of the compressed gas; and a display control step of making a remaining amount of the compressed gas displayed on the display device, based on a first calculated value obtained at a first timing in the mass computation step and a second calculated value obtained at a second timing later than the first timing in the mass computation step, the remaining amount of the compressed gas being determined in accordance with the following algorithm:

if the first calculated value is greater than the second calculated value, then the displayed amount is based on the second calculated value;

otherwise, further compare the first calculated value against the difference between the second calculated value and a preset value; and if the first calculated value is greater, then the displayed amount is based on the first calculated value;

otherwise the displayed amount is based on the difference between the second calculated value and the preset value.

* * * * *